(12) United States Patent
Kunito et al.

(10) Patent No.: US 6,292,487 B1
(45) Date of Patent: Sep. 18, 2001

(54) DATA TRANSMISSION SYSTEM AND METHOD

(75) Inventors: Yoshiyuki Kunito; Takao Terao, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/076,028

(22) Filed: May 11, 1998

(30) Foreign Application Priority Data

May 19, 1997 (JP) .................................................. 9-128584

(51) Int. Cl.$^7$ ...................................................... H04L 12/28
(52) U.S. Cl. ............................................. 370/395; 370/230
(58) Field of Search ................................... 370/395, 351, 370/389, 392, 428–9, 235, 236, 230, 231, 232–4

(56) References Cited

U.S. PATENT DOCUMENTS

| 5,541,852 | * | 7/1996 | Eyuboglu et al. | .................... | 709/232 |
| 5,742,765 | * | 4/1998 | Wong et al. | ........................... | 709/230 |
| 5,978,356 | * | 11/1999 | Elwalid et al. | ....................... | 370/230 |
| 5,982,749 | * | 11/1999 | Daniel et al. | .......................... | 370/233 |

OTHER PUBLICATIONS

Black, ATM Foundation For Broadband Networks, 1995, PP: 106–7, 122, 141, 206–33.*

* cited by examiner

*Primary Examiner*—David R. Vincent
(74) *Attorney, Agent, or Firm*—Frommer Lawrence & Haug LLP; William S. Frommer; Joe H. Shallenburger (57) ABSTRACT

A data transmission system is disclosed which is suitable for real-time data transmission.

The data transmission system (1) comprises a data buffer (2) consisting of a real-time data buffer (3) in which real-time data is stored, and an ATM segmentation block (5) to segment a real-time data outputted from the data buffer (2) into cells each of a fixed length for transmission in an asynchronous transfer mode (ATM). The ATM segmentation block (5) consists of a real-time data transmission timing signal generating means (7) for generating transmission timing signals for the cells based on the arriving intervals of the input real-time data and a transmission VC selecting means (8) for segmenting a real-time data supplied from the date buffer 2 into cells and outputting to a physical layer device (6) the real-time data formed in the cells under the transmission timing signals generated by the cell transmission timing signal generating means (7).

11 Claims, 7 Drawing Sheets

DATA TRANSMISSION SYSTEM AND METHOD

BACKGROUND OF THE INVENTION

1. Field of the Invention

The present invention relates to a system and method for ATM (Asynchronous Transfer Mode) data transmission, and more particularly to a data transmission system and method using an ATM segmentation device in which an ATM cell transmission timing signal is generated from a real-time data.

2. Description of the Related Art

These years, the asynchronous transfer mode (ATM) data transmission has actively been researched and developed for a digital communication in the fields of fast broad-band communications and broad-band ISDN (B-ISDN).

An ATM communication network comprises ATM transmitters and ATM exchanges to which ATM terminals are connected. The ATM terminal segments an information into packets of a fixed length (53 bytes) called "ATM cell" for transmission. Each of the ATM cells consists of a 5-byte header and a 48-byte payload. A sequence No., virtual channel No., etc. are written in the header, and an information to be transmitted is written in the payload. When there is much information to be transmitted by the ATM terminal of this data transmission system, the ATM terminal segments the information into a plurality of ATM cells (will also be referred to simply as "cell or cells" hereinafter) for transmission. However, when the ATM terminal has no information to transmit, it will transmit no cell. Also, the ATM transmitter is capable of transmitting, over a same transmission channel, cells transmitted from transmitting terminals of different transmission rates. The ATM receiving terminal restores an original information based on the content of the header of each received cell. Thus, the ATM transmitter has no frame period characterizing the conventional STM (Synchronous Transfer Mode) but transmits a single cell or a plurality of cells at random.

Figure 1:
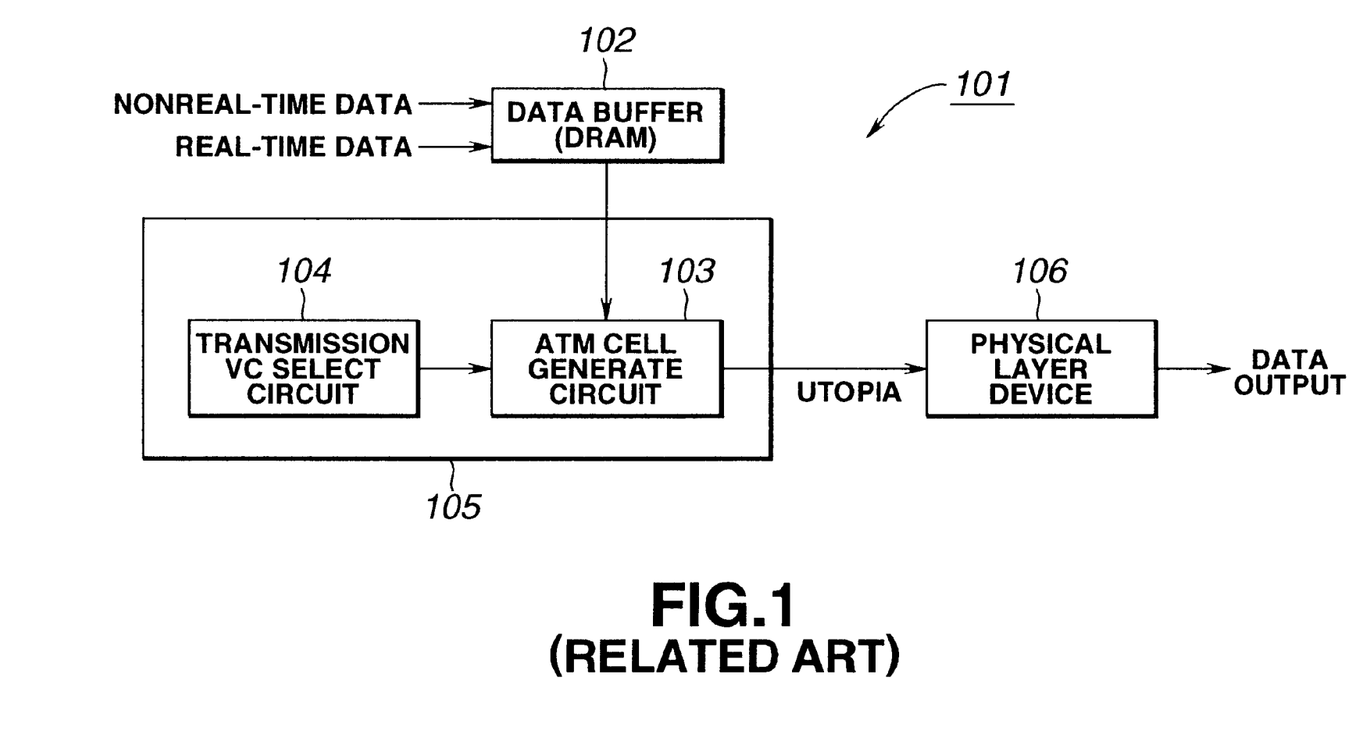
FIG. 1 is a block diagram showing the configuration of the conventional data transmitter also related to the present invention.

FIG. 1 shows a conventional data transmission system. In FIG. 1, an ATM data transmitter incorporated in each ATM transmitting terminal is generally indicated with a reference 101. The ATM transmitter 101 comprises a data buffer 102 consisting of DRAM, etc., an ATM segmentation block 105 including an ATM cell generation circuit 103 and a transmission VC (Virtual Channel) selection circuit 104, a physical layer device 106 and the like disposed downstream of the ATM segmentation block 105.

The data buffer 102 stores various data as data to be transmitted. The ATM cell generation circuit 103 of the ATM segmentation block 105 reads to-be-transmitted data stored in the data buffer 102 to generate an aforementioned 53-byte cell. The transmission VC selection circuit 104 determines a virtual channel over which each is transmitted. Also, the transmission VC selection circuit 104 incorporates a traffic shaver circuit (not illustrated) to adjust the transmission rate for each cell.

The ATM segmentation block 105 is connected to a CPU (not illustrated). The transmission VC selection circuit 104 determines a virtual channel over which a cell is to be transmitted, based on a transfer rate predetermined by the CPU, and the traffic shaver circuit will determine a time when the cell is to be transmitted. Based on the results of the above, the ATM cell generation circuit 103 reads to-be-transmitted data stored in the data buffer 102 and segments it into payloads each of 48 bytes. Further, the ATM cell generation circuit 103 write a virtual channel No., etc. as a 5-byte header for each payload to generate 53-byte cells each of which will be supplied to the physical layer device 106 via a UTOPIA (Universal Test & Operation Physical Interface for ATM) interface, etc.

The physical layer device 106 processes each received cell in a manner depending upon a certain physical layer, and then supplies it to an optical fiber (not illustrated), for example. Thus, each cell is transmitted through the optical fiber to an ATM network, and supplied to another ATM terminal via an ATM exchange (not illustrated).

The data transmitter 101 uses the above-mentioned traffic shaver circuit of the transmission VC selection circuit 104 to determine a time when a cell is to be transmitted based on a transfer rate designated by the CPU, without discrimination of the quality of to-be-transmitted data, for example, whether the data is a real-time data or a nonreal-time data.

However, the clock system for the real-time data is different from that for ATM clock system, so it is technically impossible to completely eliminate the difference between these clock systems at the time of data transmission. Therefore, the conventional data transmitter 101 is disadvantageous in that when there are both real-time data and nonreal-time data to be transmitted to outside from the physical layer device 106, an excess or shortage of data takes place due to such difference in clock system at the time of transmission even if a same transmission rate is set for both the real-time and nonreal-time data.

Furthermore, for connection of various systems which supply real-time data as mentioned above to the conventional data transmitter 101 needs a unique adjustment for each of the systems.

SUMMARY OF THE INVENTION

The present invention has an object to overcome the above-mentioned drawbacks of the prior art by providing an ATM data transmission system and method suitable for transmission of real-time data.

The above object can be accomplished by providing a data transmission system comprising, according to the present invention, a buffer means for storing data, a segmentation means for receiving a data read from the buffer means and segmenting the data into cells each of a fixed length for transmission, and a physical later device for outputting to outside the cells supplied from the segmentation means, the segmentation means comprising means for generating a transmission timing signal for the cell based on an arriving interval of the data, and a cell generating means for outputting the cells to the physical layer device based on the transmission timing signal.

According to another aspect of the present invention as in claim 2, a data transmission system is provided wherein the segmentation means transmits the cells in an asynchronous transfer mode (ATM).

According to a still another aspect of the present invention as in claim 3, a data transmission system is provided wherein the data is transmitted in real-time.

According to a yet another aspect of the present invention as in claim 4, a data transmission system is provided wherein the cell transmission timing signal generating means comprises means for calculating a mean value of input intervals of a number N (N=an integer) of previous data from latest received data to generate cell transmission timing signals based on the mean value.

Thus, based on the arriving interval of supplied real-time data, the cell transmission timing signal generating means generate cell transmission timing signals under which a real-time data segmented into cells by the ATM cell generating means are transmitted.

BRIEF DESCRIPTION OF THE DRAWINGS

These objects and other objects, features and advantages of the present intention will become more apparent from the following detailed description of the preferred embodiments of the present invention when taken in conjunction with the accompanying drawings, of which.

DETAILED DESCRIPTION OF THE PREFERRED EMBODIMENTS

Figure 2:
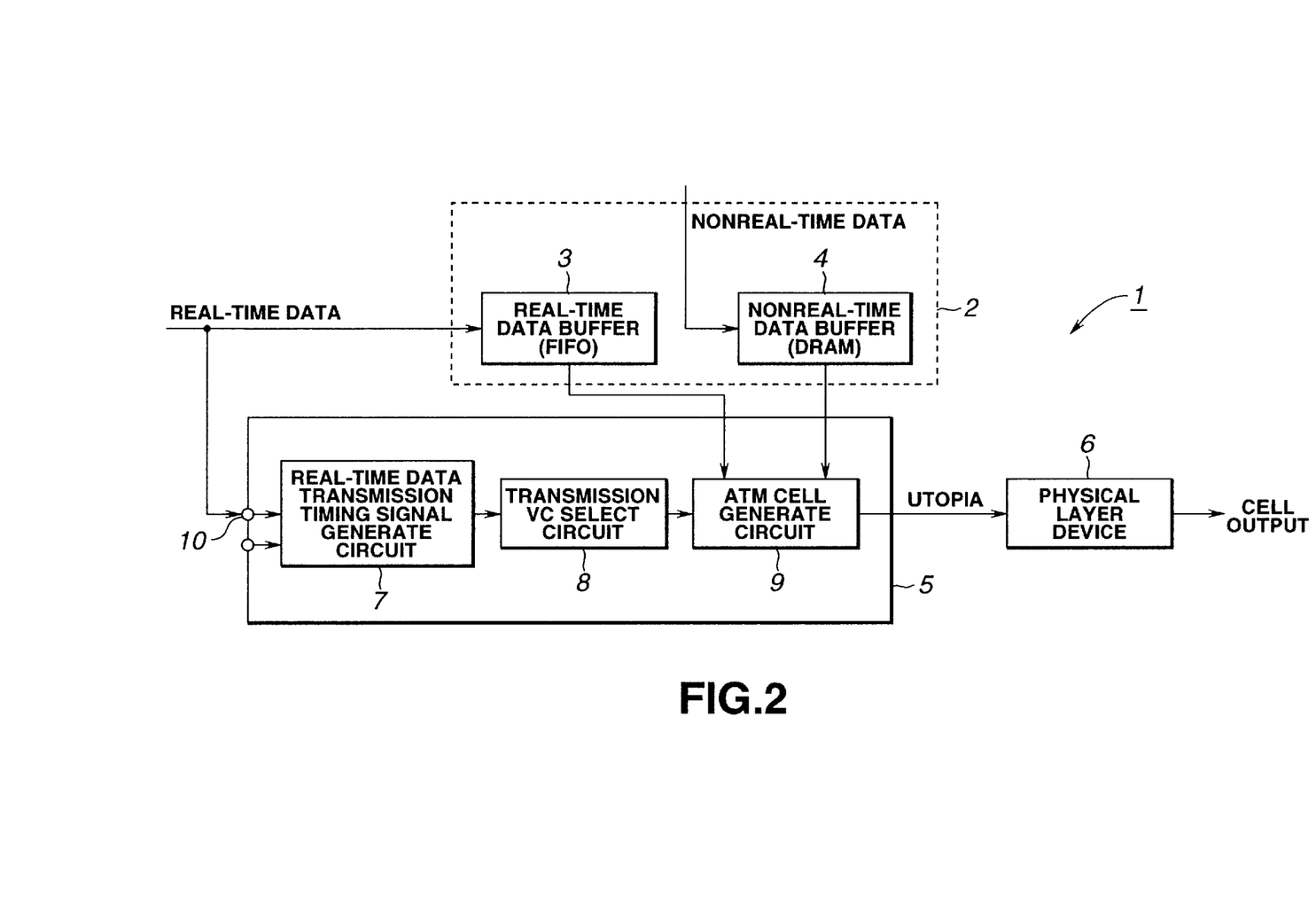
FIG. 2 is a block diagram showing the configuration of an embodiment of the data transmission system according to the present invention.

Referring now to FIG. 2, a data transmission system according to the present invention is generally indicated with a reference 1. As seen, it comprises a data buffer 2 consisting of a real-time data buffer 3 and a nonreal-time data buffer 4, an ATM segmentation block 5 consisting of a real-time data transmission timing signal generation circuit 7 and a transmission VC selection circuit 8, and a physical layer device 6 connected to the ATM segmentation block 5 through a UTOPIA (Universal Test & Operation Physical Interface for ATM) interface.

The data transmission system 1 is adapted to transmit a real-time video/audio data picked up by a video camera (not illustrated), for example, or a nonreal-time data read from a memory or the like (not illustrated).

The real-time data buffer 3 of the data buffer 2 is composed of an FIFO (First-In First-Out) memory, for example, and supplied with a real-time data as to-be-transmitted data from the video camera or the like. On the other hand, the nonreal-time data buffer 4 included in the data buffer 2 is composed of a DRAM (Dynamic Random Access Memory), for example, and supplied with a nonreal-time data as to-be-transmitted data from the memory or the like.

The ATM segmentation block 5 has a real-time data input port 10 and is supplied with a real-time data as to-be-transmitted data from the video camera or the like through the input port 10. The real-time data transmission timing signal generation circuit 7 is adapted to detect a transmission rate of the supplied real-time data through detection of a header sync of the real-time data supplied through the real-time data input port 10. The real-time data transmission timing signal generation circuit 7 will be further discussed later.

The transmission VS selection circuit 8 determines a real-time data transmission rate detected by the real-time data transmission timing signal generation circuit 7, and a virtual channel over which data is to be transmitted, from a nonreal-time data transfer rate having been set by a CPU (not illustrated). The ATM cell generation circuit 9 reads, based on the results of the decision by the transmission VC selection circuit 8, a to-be-transmitted data stored in the real-time data buffer 3 or nonreal-time data buffer 4 in the data buffer 2, segments the data into payloads each of 48 bytes, and writes a virtual channel No., etc. as a 5-byte header for each payload to generate cells each of 53 bytes.

Figure 3A:
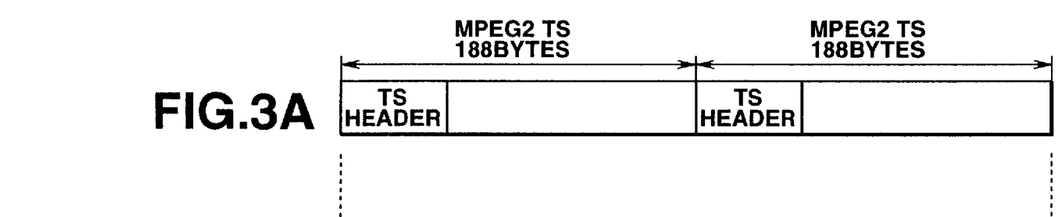
FIGS. 3A to 3E are explanatory drawings of a cell generation to be done when a transport stream in which a real-time data is generated in the MPEG2 format is inputted.
Figure 3B:
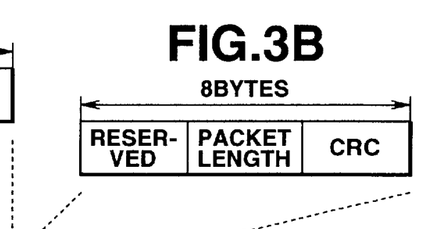
Figure 3C:
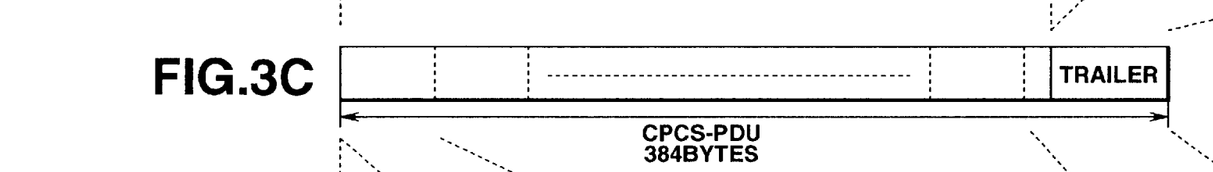
Figure 3D:
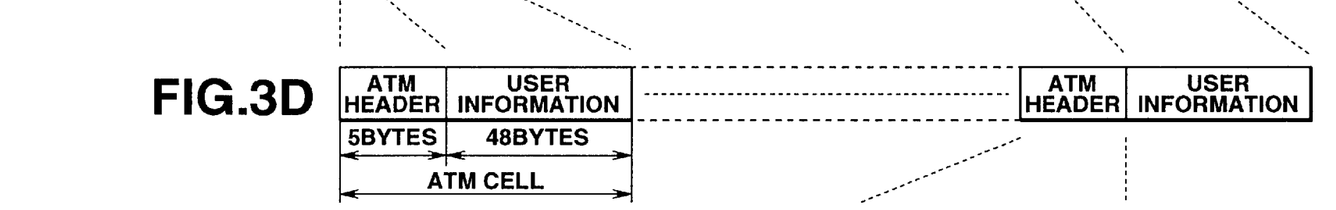
Figure 3E:
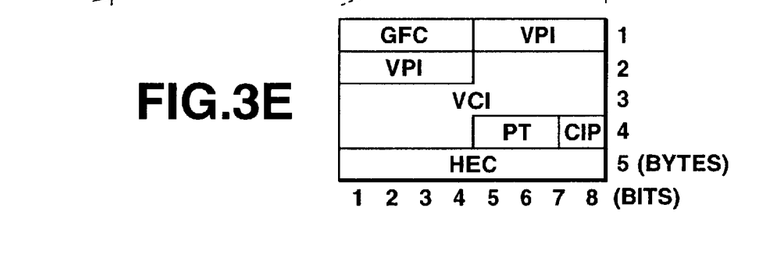

Referring now to FIGS. 3A to 3E, a cell generation to be done when a transport stream in which a real-time data is generated in the MPEG2 format is inputted, will be discussed. When two transport streams as shown in FIG. 3A are supplied, they are segmented into 8 cells each of 48 bytes as shown in FIG. 3C and a CRC-32 (cyclic redundancy code) to assure that the frame is normal, is added to a trailer as shown in FIG. 3B. An ATM header of 5 bytes is added to the cell of 48 bytes to generate an ATM cell of 53 bytes as shown in FIG. 3D. The ATM header of 5 bytes is composed of GFC, VPI, VCL PT, CLP, and HEC as shown in FIG. 3E. GFC transmitted from various terminals from conflicting with each other so that a transmission line can evenly be shared by the terminals. VPI stands for Virtual Path Identifier to determine which one of virtual channels multiplexed in the virtual path thus determined is to be used for data transmission to a destination. PT stands for Payload Type to indicate of which an information in the user information of 48 bytes in the ATM cell is of, user information cell, maintenance/run cell of resource management cell. CLP stands for Cell Loss Priority used, when the traffic overflows in a network, to provide such a traffic control that cells of lower importance are preferentially discarded and only important cells are transmitted. HEC standard for Header Error Control which is 1 byte and provides cyclic redundancy check for an error in a preceding header information of 4 bytes. Each of the cells is supplied to the physical layer device 6 through the UTOPIA interface.

The physical layer device 6 processes each received cell in a manner depending upon a certain physical layer, and then supplies it to an optical fiber (not illustrated), for example. Thus, each cell is transmitted through the optical fiber to an ATM network, and supplied to another ATM terminal via an ATM exchange (not illustrated).

Next, the real-time data transmission timing signal generation circuit 7 in the ATM segmentation block 5 will be described in detail below. The circuit 7 comprises a header sync detection circuit 11, a header sync interval filter circuit 12, and a cell transmission timing signal generation circuit 12, as will be seen from FIG. 4.

Figure 7:
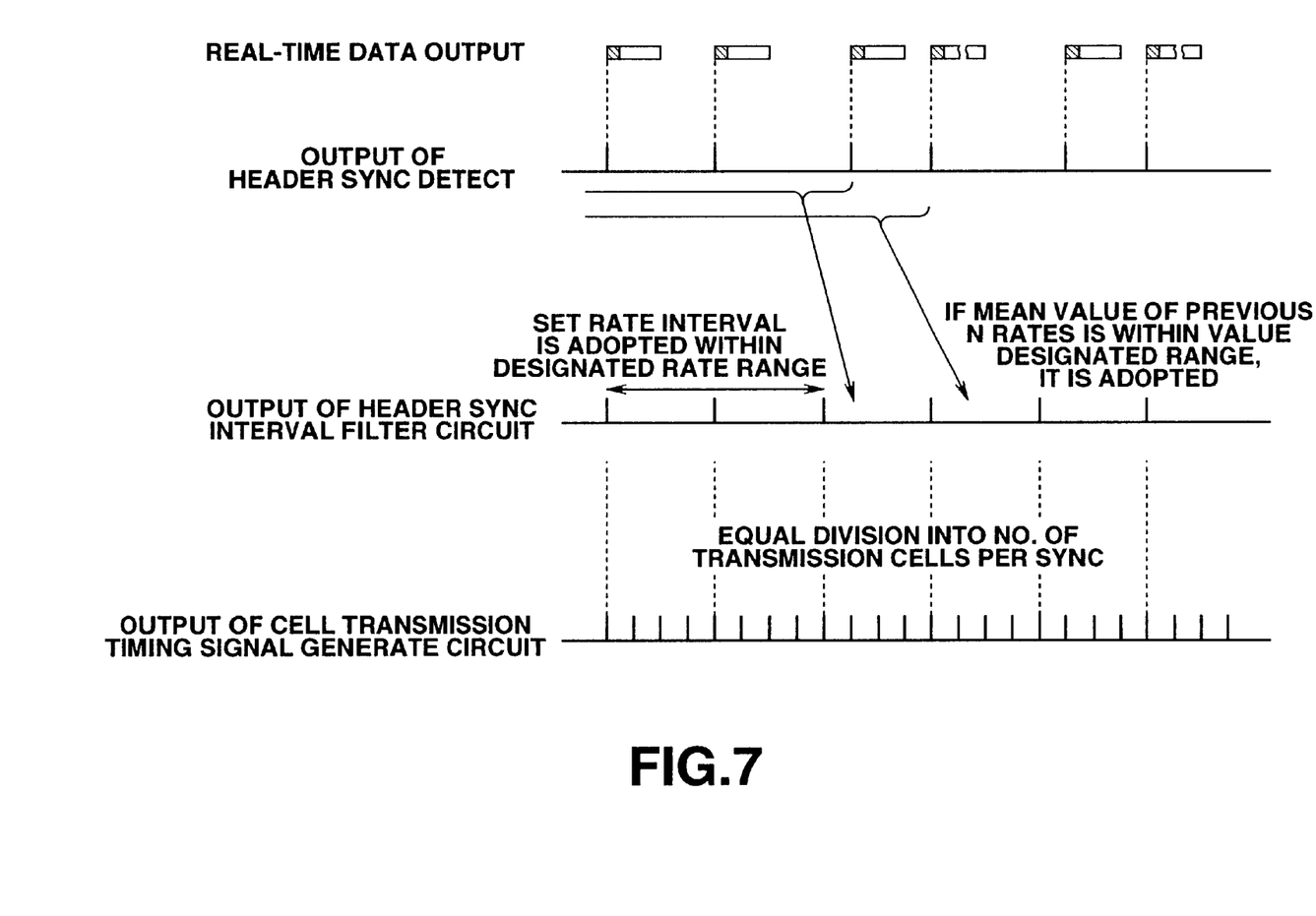
FIG. 7 is a functional timing chart of the real-time data transmission timing signal generation circuit of the data transmission system according to the present invention.

The header sync detection circuit 11 detects a header sync of a real-time data supplied from the real-time data input port 10 of the ATM segmentation block 5 as shown in FIG. 7, and outputs the timing of the header sync to the header sync interval filter circuit 12.

Figure 4:
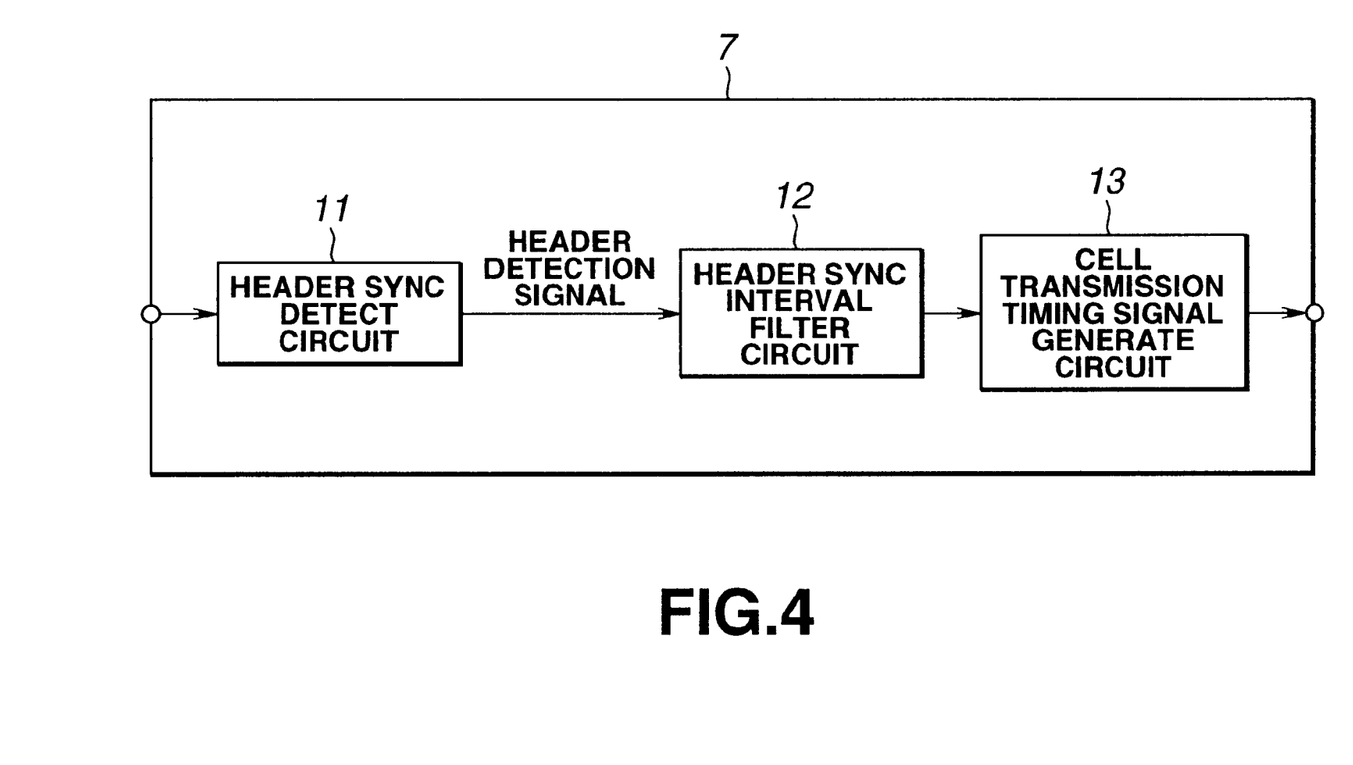
FIG. 4 is a block diagram of an example of the real-time data transmission timing signal generation circuit of the data transmission system according to the present invention.

The header sync interval filter circuit 12 has a function of absorbing jitters in a supplied real-time data in order to transmit jitter-less cells to the ATM network.

More specifically, the header sync interval filter circuit 12 is adapted to use a number N of previous sync arrivals counted from the latest sync to generate a mean timing for one sync based on a header detection signal supplied from the header sync detection circuit 11. Thus, jitters can be suppressed during real-time data transmission, so the data transmission system 1 can assure that real-time data transmission can be done by making the most of the advantages of the ATM communication.

The value of the number N should be set to a suitable one for a system in which the data transmission system according to the present invention is to be used, taking in consideration a tradeoff between a larger absorption of jitters attainable with a larger value of the number N and a larger size of the real-time data buffer 3 required due to the larger value. For example, when data is to be transmitted in a system in which an ATM network of a variable bit rate is used and data has to be transmitted in the form of cells precisely at data arriving intervals, not at a mean value of the arriving intervals, the number N has only to set N=1 or the header sync interval filter circuit 12 may not be provided.

Figure 5:
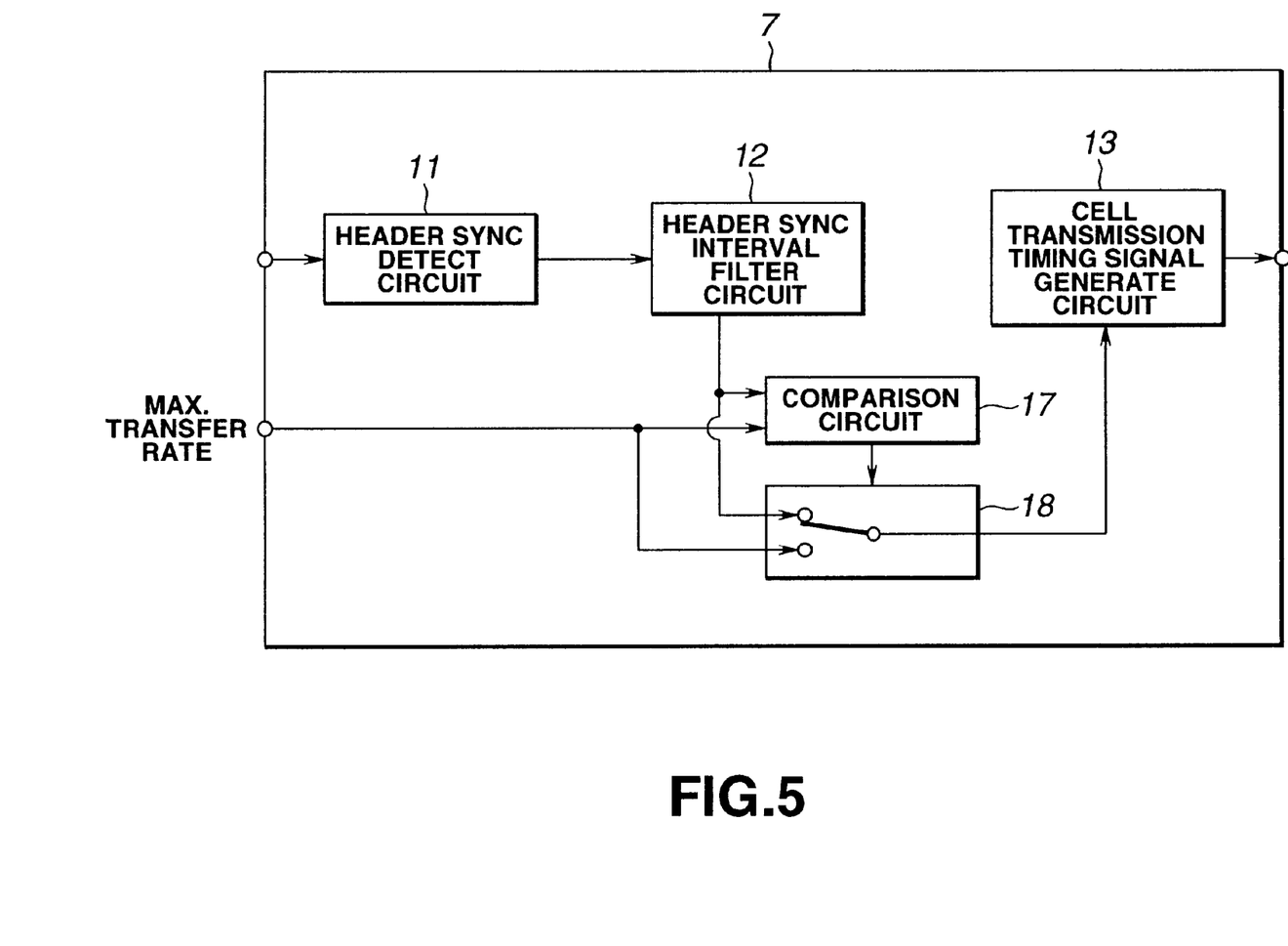
FIG. 5 is a block diagram of another embodiment of the data transmission system according to the present invention.

For an ATM transmission, an application should be submitted beforehand to the authorities concerned for permission of a band for the ATM transmission. Also an application of a maximum transfer rate for the ATM transmission should be submitted to the authorities. Any other band and maximum transfer rate should never be used during the ATM transmission. Since any cells transmitted at a higher rate should possibly be discarded during the ATM transmission, it is important to strictly abide by the applications for real-time data difficult to re-transmit. Taking the above in consideration, the real-time data transmission timing signal generation circuit 7 may comprise a comparison circuit to compare a mean timing set by the head sync interval filter circuit 12 and a predetermined maximum transfer rate, and a switching circuit 18 to provide a timing for a transmission at the maximum transfer rate when the mean timing is earlier than the maximum transfer rate. Alternately, the header sync interval filter circuit 12 itself may be provided with such a function, Because of the aforementioned configuration, the data transmission system 1 according to the present invention can make a cell transmission to an ATM network precisely at the applied maximum transfer rate.

Figure 6:
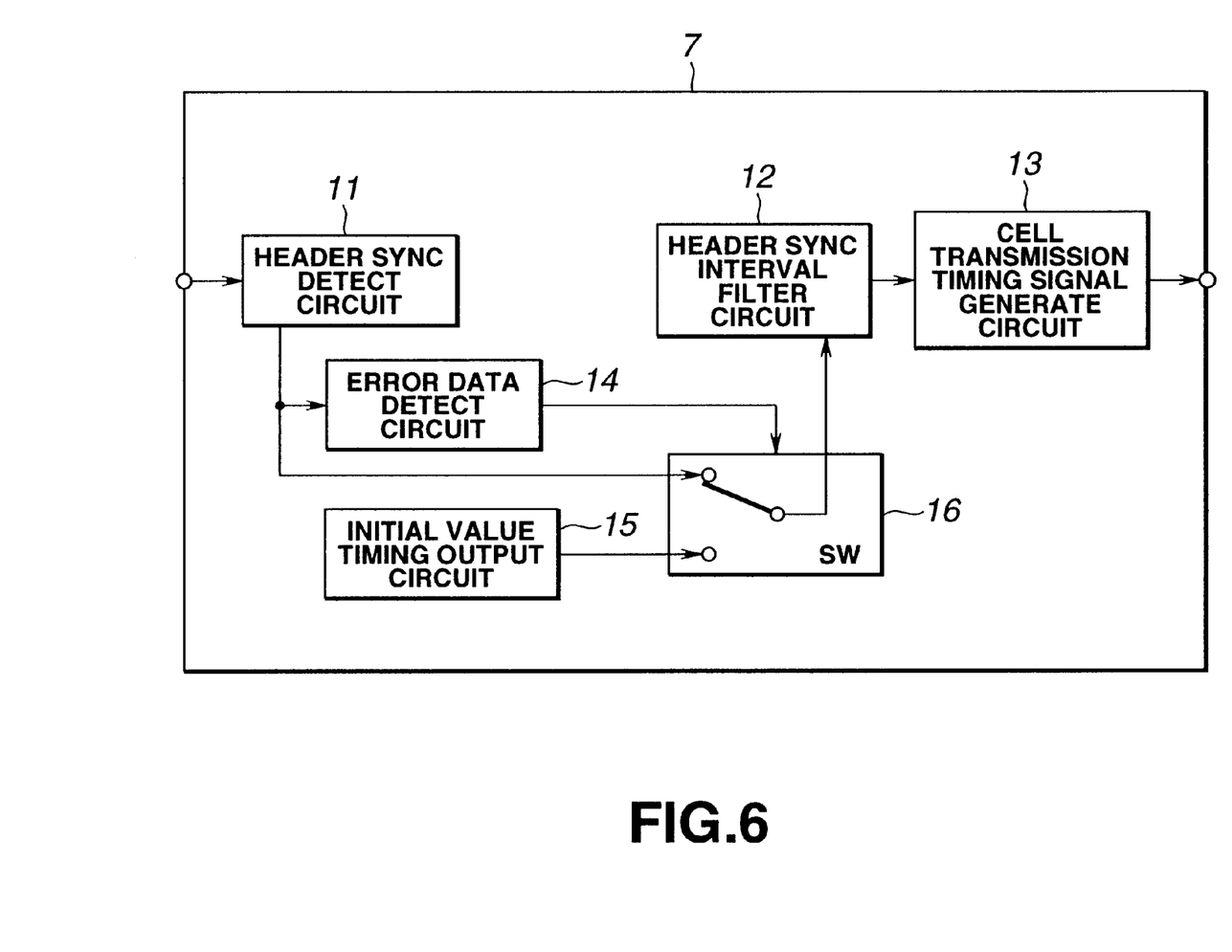
FIG. 6 is a block diagram of a still another embodiment of the data transmission system according to the present invention.

Further, for compensation of an error data caused at the rise and fall of a real-time data transmission and jitters which cannot be absorbed by the header sync interval filter circuit 12 and the above-mentioned circuit additionally provided downstream of the circuit 12, there may be additionally provided in the real-time transmission timing signal generation circuit 7 an error data detection circuit 14 to detect a deviation from a predetermined range, an initial value timing signal output circuit 15 to output a timing signal in accordance with a predetermined initial value when the maximum transfer rate deviates from the predetermined range, and a switching circuit 16 to selectively allow, based on the result of a detection by the error data detection circuit 14, the header sync detection circuit 11 and initial value timing output circuit 15 to output, as shown in FIG. 6. Alternatively, the header sync interval filter circuit 12 itself may be additionally provided with such functions. Owing to either of such configurations, the data transmission system 1 can transmit data with a further improved reliability.

The cell transmission timing signal generation circuit 13 generates timing signals resulted from equal division of a timing signal for one sync from the header sync interval filter circuit 12 into a number of cells to be transmitted per sync. In the real-time data transmission timing signal generation circuit 7, the timing signals are supplied to the transmission VC selection circuit 8 to determine a transmission virtual channel based on a transmission rate determined with the timing signals and a nonreal-time data transfer rate set by the CPU (not illustrated). Based on the decision by the transmission VC selection circuit 8, the ATM cell generation circuit 9 reads to-be-transmitted data stored in the real-time data buffer 3 or nonreal-time data buffer 4 of the data buffer 2, divides it into payloads each of 48 bytes, writes a sequence No., virtual channel No., etc. as a 5-byte header for each of the payloads to generate 53-bytes cells, and transmits them to the physical layer device 6.

The data transmission system 1 of the present invention is capable of transmitting data in the ATM mode precisely on the real-time basis without any excess or shortage of data during the transmission.

As having been described in the foregoing, in the data transmission system according to the present invention, the cell transmission timing signal generation circuit generates, based on the arriving intervals of supplied real-time data, transmission timing signals, and the ATM cell generate means segments, based on the transmission timing signals, the real-time data into cells for transmission. Therefore, cell transmission timing signals are automatically generated from supplied real-time data, whereby it is possible to maintain the real-time degree of real-time data during the transmission.

What is claimed is:

1. A data transmission system, comprising:
   a buffer means for storing data;
   a segmentation means for receiving data read from the buffer means and segmenting the data into cells of a fixed length for transmission; and
   a physical layer device for outputting the cells supplied from the segmentation means,
   the segmentation means comprising means for generating a transmission timing signal for the cell based on a plurality of arriving intervals of the data, and a cell generating means for outputting the cells to the physical layer device based on the transmission timing signal.

2. The system as set forth in claim 1, wherein the segmentation means transmits the cells in an asynchronous transfer mode.

3. The system as set forth in claim 1, wherein the data is transmitted in real-time.

4. The system as set forth in claim 1, wherein the cell transmission timing signal generating means for calculating a mean value of input intervals of a number N (N=an integer) of previous data from latest received data to generate cell transmission timing signals based on the mean value.

5. The system as set forth in claim 4, wherein the segmentation means compares a transmission timing signal generated based on the mean value and a predetermined maximum transfer rate and outputs the result of the comparison.

6. The system as set forth in claim 5, wherein the segmentation means transmits the data at the maximum transfer rate when the comparison results shows that the transmitted timing signal is larger than the maximum transfer rate signal.

7. The system as set forth in claim 4, wherein the segmentation means comprises:
   means for discriminating whether an error data has been inputted;
   an initial value transmission timing signal output circuit to output a transmission timing signal of a predetermined value; and
   a switching means for switching the transmission timing signal from the cell transmission timing signal to the transmission timing signal of the predetermined value when the error data discriminating means has decided that an error data has been inputted.

8. A data transmission method, comprising the steps of:

storing data;

reading the stored data;

segmenting the read data into cells of a fixed length for transmission; and transmitting the cells formed by the segmentation;

the cell transmitting step further comprising:

generating a transmission timing signal for the cell based on a plurality of arriving intervals of the data; and outputting the cells to outside based on the transmission timing signal.

9. The method as set forth in claim 8, wherein in the cell transmitting step, the cells are transmitted in an asynchronous transfer mode.

10. The method as set forth in claim 9, wherein the data is transmitted in real-time.

11. The method as set forth in claim 8, wherein the cell transmitting step comprises a step of calculating a mean value of input intervals of a number N (N=an integer) of previous data from latest received data to generate cell transmission timing signals based on the mean value.

* * * * *